(12) United States Patent
Lu

(10) Patent No.: US 7,733,786 B2
(45) Date of Patent: Jun. 8, 2010

(54) METHOD AND APPARATUS FOR PERFORMING A CONSTRAINT SHORTEST PATH FIRST COMPUTATION

(75) Inventor: Wenhu Lu, San Jose, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 196 days.

(21) Appl. No.: 12/121,618

(22) Filed: May 15, 2008

(65) Prior Publication Data

US 2009/0285208 A1 Nov. 19, 2009

(51) Int. Cl.
H04L 12/28 (2006.01)
(52) U.S. Cl. .................... 370/238; 370/230.1
(58) Field of Classification Search ......... 370/225–238, 370/389
See application file for complete search history.

(56) References Cited

U.S. PATENT DOCUMENTS

| 6,301,244 | B1 * | 10/2001 | Huang et al. | 370/351 |
|---|---|---|---|---|
| 6,628,649 | B1 * | 9/2003 | Raj et al. | 370/360 |
| 7,324,453 | B2 | 1/2008 | Wu et al. | |
| 7,512,063 | B2 * | 3/2009 | Vasseur et al. | 370/217 |
| 7,515,529 | B2 * | 4/2009 | Vasseur et al. | 370/221 |
| 2003/0118024 | A1 * | 6/2003 | Lee et al. | 370/395.1 |
| 2006/0126496 | A1 * | 6/2006 | Filsfils et al. | 370/216 |
| 2006/0291391 | A1 * | 12/2006 | Vasseur et al. | 370/235 |
| 2007/0070909 | A1 * | 3/2007 | Reeve | 370/238 |

OTHER PUBLICATIONS

Arshad, Muhammad Taimur, "Routing Traffic Reliably (RTR) A CSPF Algorithm," Mar. 26, 2003, 8 pages.
Liu, Gang and Ramakrishnan, K.G., "A*Prune: An Algorithm for Finding K Shortest Paths Subject to Multiple Constraints," IEEE INFOCOM 2001, 0-7803-7016-3/01 © 2001 IEEE, pp. 743-749.
Jabbari, Bijan, et al., "On Constraints for Path Computation in Multi-layer Switched Networks," IEICE Trans. Commun., vol. Exx-B, No. xx XXXX 200x, Final manuscript received Mar. 9, 2007, pp. 1-6.
"Information Technology—Telecommunications and Information Exchange between Systems—Intermediate System to Intermediate System Intra-domain Routeing Information Exchange Protocol for use in Conjunction with the Protocol for Providing the Connection-less-mode Network Service (ISO 8473)," International Standard, ISO/IEC 10589, Second Edition, Nov. 15, 2002, Reference No. ISO/IEC 10589:2002(E), Geneva, Switzerland, pp. 1-210.
"Implementing A Constraint-based Shortest Path First Algorithm in Intelligent Optical Networks," MAHI Networks, Copyright © 2003 Mahi Networks, Inc., pp. 1-11.
Farrel, A., et al., "A Path Computation Element (PCE)-Based Architecture," Request for Comments (RFC) 4655, Aug. 2006, pp. 1-40.
Moy, J., "OSPF Version 2," Request for Comments: 2328, Apr. 1998, pp. 1-244.

* cited by examiner

*Primary Examiner*—William Trost, IV
*Assistant Examiner*—Emmanuel Maglo
(74) *Attorney, Agent, or Firm*—Blakely, Sokoloff, Taylor & Zafman LLP

(57) ABSTRACT

A method and apparatus for performing a constrained shortest path first (CSPF) computation is described. In one embodiment of the invention, the network element receives a request with one or more exclusion constraints or a path re-optimization request. The network element marks one or more attribute bits in a traffic engineering data structure based on the request. If an exclusion bit is set for a link, that link is skipped during CSPF computation. If a re-optimization bit is set for a link, the allocated bandwidth of the link is added to the advertised bandwidth of the link to form a re-optimization comparison value, which is used for a bandwidth comparison during path re-optimization.

23 Claims, 9 Drawing Sheets

FIG. 6

NODE LEVEL 620

| NETWORK ELEMENT 602 | LINK TREE 604 | EXCLUDE BIT 606 |
|---|---|---|
| NETWORK ELEMENT 100 | P1 | 0 |
| NETWORK ELEMENT 502 | P2 | 0 |
| NETWORK ELEMENT 504 | P3 | 0 |
| NETWORK ELEMENT 506 | P4 | 0 |
| NETWORK ELEMENT 508 | P5 | 0 |
| NETWORK ELEMENT 509 | P6 | 0 |

LINK LEVEL 630

| LINK TREE 604 | LINK 608 | COST 610 | BANDWIDTH 612 | EXCLUDE BIT 614 | RE-OPTIMIZATION BIT 616 | CURRENTLY ALLOCATED BW 618 |
|---|---|---|---|---|---|---|
| P1 | 510 | 10 | 60 | 1 | 0 | 0 |
| P1 | 512 | 7 | 20 | 0 | 1 | 50 |
| P2 | 510 | 10 | 60 | 1 | 0 | 0 |
| P2 | 514 | 3 | 80 | 1 | 0 | 0 |
| P2 | 520 | 5 | 40 | 0 | 1 | 50 |
| P2 | 522 | 12 | 40 | 0 | 1 | 50 |
| P3 | 512 | 7 | 20 | 0 | 1 | 50 |
| P3 | 514 | 3 | 80 | 1 | 0 | 0 |
| P3 | 516 | 3 | 40 | 0 | 1 | 50 |
| P4 | 516 | 3 | 40 | 0 | 1 | 50 |
| P4 | 520 | 5 | 40 | 0 | 1 | 50 |
| P4 | 518 | 8 | 40 | 0 | 0 | 0 |
| P5 | 522 | 12 | 40 | 0 | 1 | 50 |
| P5 | 518 | 8 | 40 | 0 | 0 | 0 |
| P6 | 524 | 3 | 90 | 0 | 0 | 0 |
| P6 | 526 | 5 | 100 | 0 | 0 | 0 |

TE DATA STRUCTURE 116

METHOD AND APPARATUS FOR PERFORMING A CONSTRAINT SHORTEST PATH FIRST COMPUTATION

BACKGROUND

1. Field

Embodiments of the invention relate to the field of networking; and more specifically, to computing a constraint based path.

2. Background

Constraint based path computation processes paths based on one or more constraints. For example, a network administrator may use constraint based path computation to select a path from a source to a destination in a given network based on one or more constraints. In the network, the characteristics of the links (e.g., cost, available bandwidth, link color, etc.) are propagated throughout the network using link-state routing protocols (e.g., Open Shortest Path First (OSPF) (described in Request For Comments (RFC) 2328, "OSPF Version 2", April 1998), Intermediate System to Intermediate System (IS-IS) (described in International Standard ISO/IEC 10589:2002E, Nov. 15, 2002)). Typically these characteristics are stored in a traffic engineering database on each network element in the network. Thus, the traffic engineering database stores a representation of the topology of the network. A network element may receive a service request for a path to a destination (thus this network element is the source of the path) with one or more constraints (e.g., a network administrator, using a command line interface (CLI), requests a path to a destination given one or more constraints). The network element computes the requested path based on the constraints and the information in the traffic engineering database.

For example, the request may include one or more exclusion constraints that require the path not go through certain network elements or certain links. Typically, during path computation, each network element or link in the network is compared to the list of exclusion constraints to determine if that network element or link should be excluded. Thus, if there are many exclusion constraints, multiple comparisons are made for each network element and/or link in the network (e.g., one comparison for each constraint on the list).

After a path has been computed, that path can be re-optimized. For example, after a path has been computed and the path has been assigned a certain amount of bandwidth, a network administrator may want to see if that path can be re-optimized, for example, with a bigger amount of bandwidth. There may be numerous reasons why a better path and/or better path characteristics (e.g., higher available bandwidth) exist in the network compared to the computed path. For example, if a network element joined the network after the path was originally computed, a better path and/or better path characteristics may exist. As another example, the characteristics of the links of the path may change over time (e.g., they may have more available bandwidth at a later time). During path re-optimization, the currently allocated bandwidth of the links of the calculated paths is taken into account. For example, if the path had reserved a bandwidth of 50 (e.g., each link has a currently allocated bandwidth of 50), that allocation is taken into account when processing the re-optimization request.

Typically, during path re-optimization, each link in the network is compared to the links of the calculated path to determine whether to take into account the currently allocated bandwidth of that link. Thus, if there are many links in the calculated path, multiple comparisons are made for each link in the network (e.g., one comparison for each link in the path).

BRIEF DESCRIPTION OF THE DRAWINGS

The invention may best be understood by referring to the following description and accompanying drawings that are used to illustrate embodiments of the invention. In the drawings:

FIG. 6 is a block diagram illustrating an exemplary traffic engineering data structure according to one embodiment of the invention.

DETAILED DESCRIPTION

Figure 1:
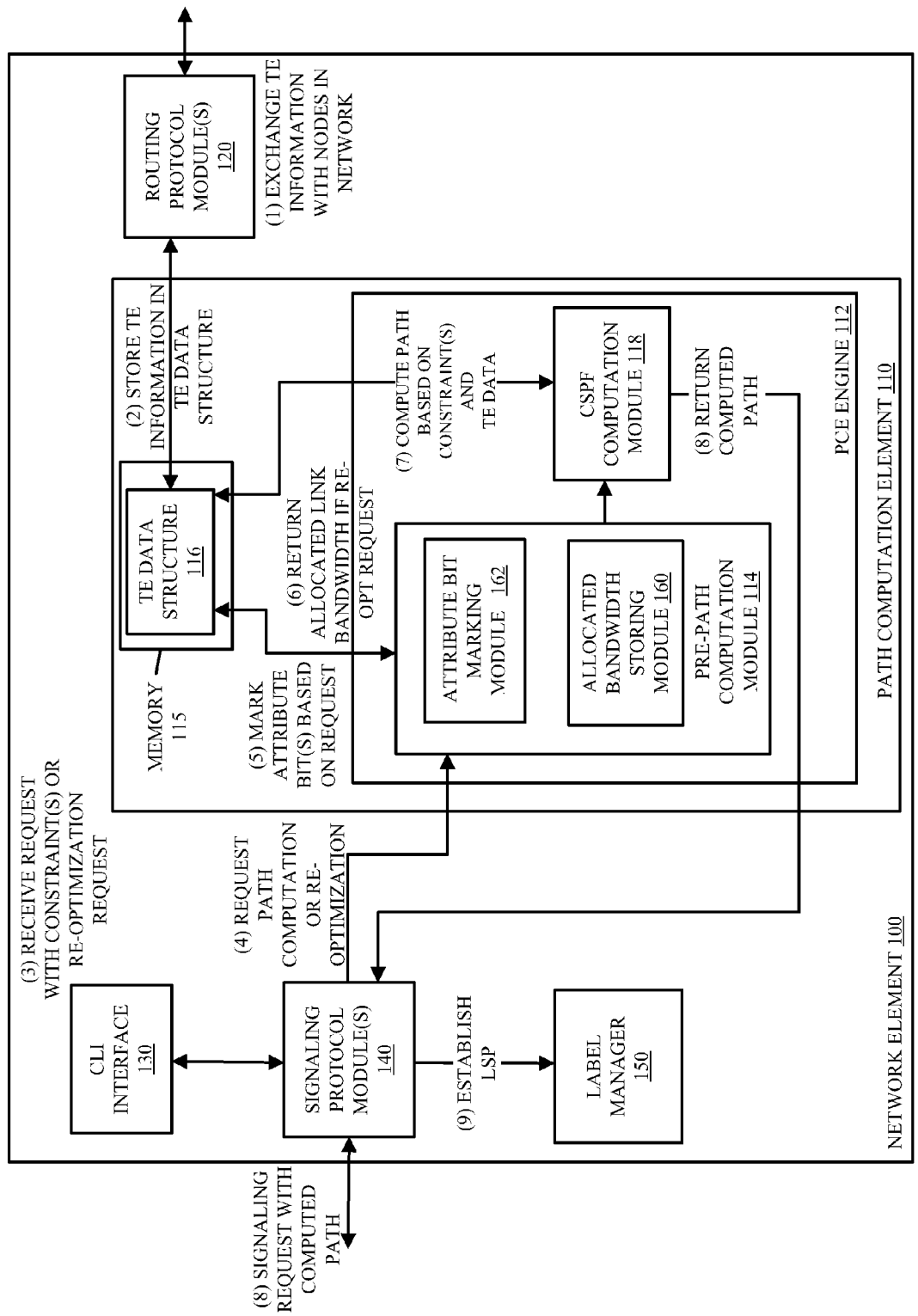
FIG. 1 is a data flow diagram illustrating an exemplary network element performing a constrained shortest path first computation for a requested path with one or more exclusion constraints or a re-optimization request according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The techniques shown in the figures can be implemented using code and data stored and executed on one or more electronic devices (e.g., a computer, a network element, etc.). Such electronic devices store and communicate (internally and with other electronic devices over a network) code and data using machine-readable media, such as machine storage media (e.g., magnetic disks; optical disks; random access memory; read only memory; flash memory devices) and machine communication media (e.g., electrical, optical, acoustical or other form of propagated signals—such as carrier waves, infrared signals, digital signals, etc.). In addition, such electronic devices typically include a set of one or more processors coupled to one or more other components, such as a storage device, one or more user input/output devices (e.g., a keyboard and/or a display), and a network connection. The coupling of the set of processors and other components is typically through one or more busses and bridges (also termed as bus controllers). The storage device and signals carrying the network traffic respectively represent one or more machine storage media and machine communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge, etc.) is a piece of networking equipment, including hardware and software that communicatively interconnects other equipment on the network (e.g., other network elements, computer end stations, etc.). Subscriber computer end stations (e.g., workstations, laptops, palm tops, mobile phones, etc.) access content/services provided over the Internet and/or content/services provided on virtual private networks (VPNs) overlaid on the Internet. The content and/or services are typically provided by one or more server computing end stations belonging to a service or content provider, and may include public webpages (free content, store fronts, search services, etc.), private webpages (e.g., username/password accessed webpages providing email services, etc.), corporate networks over VPNs, etc. Typically, subscriber computing end stations are coupled (e.g., through customer premise equipment coupled to an access network, wirelessly to an access network) to edge network elements, which are coupled through core network elements of the Internet to the server computing end stations.

Some network elements support the configuration of multiple contexts. As used herein, each context is an instance of a virtual network element (e.g., a virtual router or a virtual bridge). Each context typically shares one or more computing resources (e.g., memory, processing cycles, etc.) with other contexts configured on the network element, yet is independently administrable. For example, in the case of multiple virtual routers, each of the virtual routers shares computing resources, but is separate from those other virtual routers regarding its management domain, authentication, authorization, and accounting (AAA) name space, IP address, and routing database(es).

FIG. 1 is a data flow diagram illustrating an exemplary network element performing a constrained shortest path first computation for a requested path with one or more exclusion constraints or a re-optimization request according to one embodiment of the invention. The operations of FIG. 1 will be described with reference to the exemplary embodiment of FIGS. 2A, 3, 4, 5A, 5B, and 6. However, it should be understood that the operations of FIG. 1 can be performed by embodiments of the invention other than those discussed with reference to FIGS. 2A, 3, 4, 5A, 5B, and 6, and the embodiments discussed with reference to FIGS. 2A, 3, 4, 5A, 5B, and 6 can be performed differently than those discussed with reference to FIG. 1.

With reference to FIG. 1, the network element 100 includes a path computation element (PCE) 110, routing protocol module(s) 120, command line interface (CLI) 130, signaling protocol module(s) 140, and label manager 150. The PCE 110 includes a PCE engine 112 coupled with a traffic engineering (TE) data structure 116 in the memory 115. The memory 115 may take on a variety of forms in different embodiments of the invention, including volatile memory (e.g., DRAM, SRAM, etc.) and non-volatile memory (e.g., hard disk, flash memory, phase change memory (PCM), etc.). In addition, while in some embodiments of the invention the memory 115 is local memory to the PCE 110, in alternative embodiments of the invention the memory 115 is not local to the PCE 110 (e.g., the memory 115 may be shared memory). The PCE engine 112 includes the pre-path computation module 114 and the constrained shortest path first (CSPF) computation module 118. The pre-path computation module 114 includes the attribute bit marking module 162 and the allocated bandwidth storing module 160.

Figure 5A:
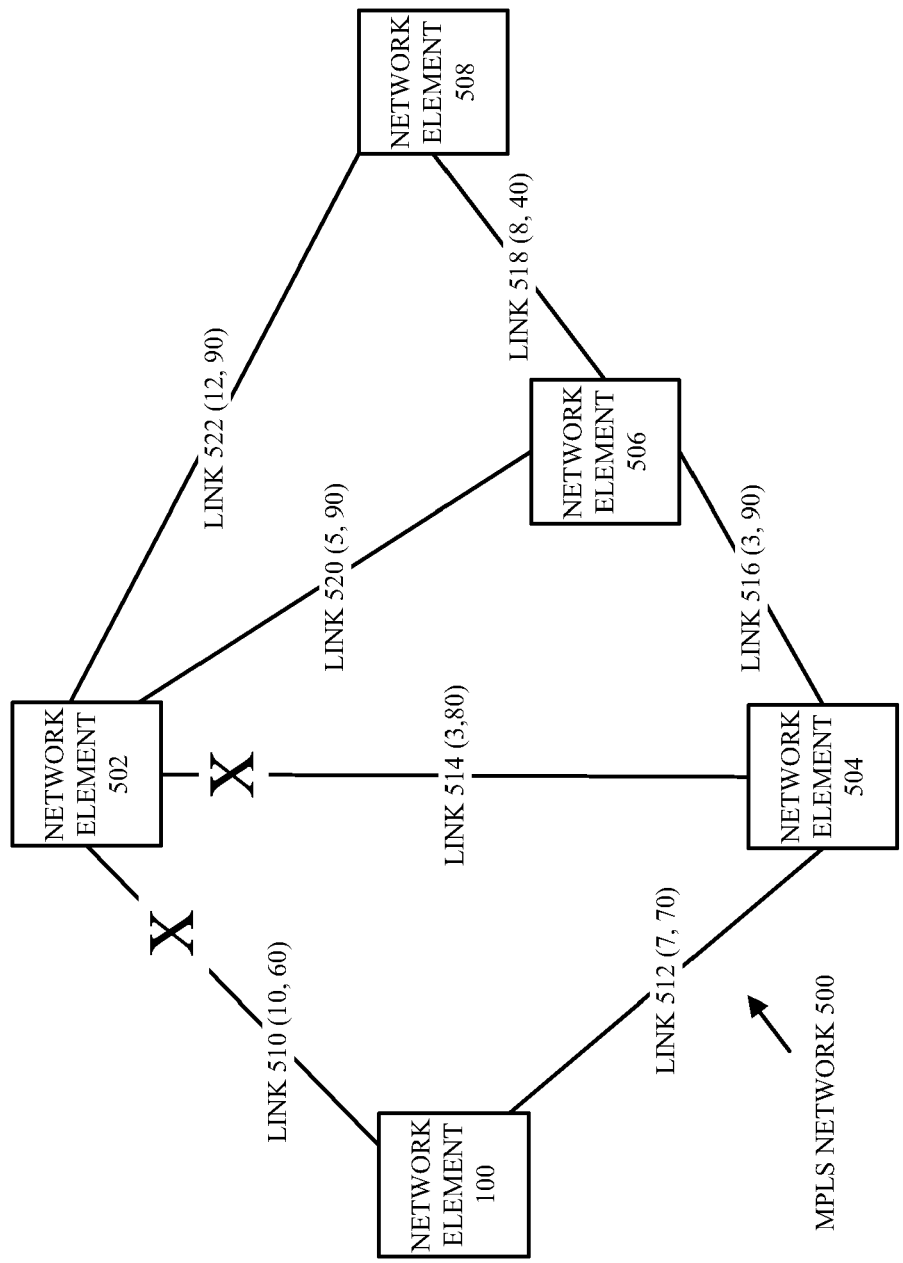
FIG. 5A is a block diagram illustrating an exemplary network with two links to be excluded according to one embodiment of the invention.

According to one embodiment of the invention, the network element 100 is one of a plurality of network elements in the MPLS network 500 in FIG. 5A, and is a source of a label switched path (LSP) (e.g., the network element 100 is an ingress Label Edge Router (LER), or sometimes called a headend router). In the exemplary embodiment of FIG. 5A the network element 100 is a source of an LSP (e.g., the network element 100 computes the LSP and is the beginning of the LSP) to the network element 508, which is the destination of the LSP (thus, e.g., the network element 508 is an egress LER, or sometimes called a tailend router). The MPLS network 500 also includes the network elements 502, 504, and 506, which are each intermediate network elements (e.g., Label Switch Routers (LSRs)). Any path from the network element 100 to the network element 508 must go through at least one intermediate network element.

In FIG. 5A, the network element 100 is coupled with the network element 502 via the link 510 (cost of 10, available bandwidth of 60) and is coupled with the network element 504 via the link 512 (cost of 7, available bandwidth of 70). The network element 502 is coupled with: 1) the network element 100 via the link 510, 2) the network element 504 via the link 514 (cost of 3, available bandwidth of 80), 3) the network element 506 via the link 520 (cost of 5, available bandwidth of 90), and 4) the network element 508 via the link 522 (cost of 12, available bandwidth of 90). The network element 504 is coupled with: 1) the network element 100 via the link 512, 2) the network element 502 via the link 514, and 3) the network element 506 via the link 516 (cost of 3, available bandwidth of 90). The network element 506 is coupled with: 1) the network element 504 via the link 516, 2) the network element 502 via the link 520, and 3) the network element 508 via the link 518 (cost of 8, available bandwidth of 40). As used herein, a neighbor of a network element is a network element that is a single hop away from that network element. For example, in FIG. 5A, the neighbors of the network element 100 include the network elements 502 and 504.

According to one embodiment of the invention, the network element 100 exchanges traffic engineering information with the other network elements in the network with use of the routing protocol module(s) 120. For example, the routing protocol module(s) 120 includes link state routing protocols (e.g., OSPF, IS-IS) to exchange traffic engineering information. Thus, at an operation 1, the network element 100 uses its routing protocol module(s) 120 to exchange traffic engineering information with the network elements in the MPLS network 500. From each network element in the MPLS network 500, the network element 100 may receive traffic engineering information including a list of that network element's neighbors, network resource information (e.g., characteristics of the links (e.g., available bandwidth, link color, etc.)), etc. For example, the network element 504 may exchange information with the network element 100 indicating that the link 512 (the link 512 is coupling the network element 100 with the network element 504) has a cost of 7 and an available bandwidth of 70.

At operation 2, the network element 100 stores the received traffic engineering information in the traffic engineering data structure 116. The traffic engineering data structure 116 can take a variety of forms in different embodiments of the invention, including a database, list, tree, trie, table, etc. According to one embodiment of the invention, the data in the traffic engineering data structure 116 collectively forms a topology of the MPLS network 500 which includes the linking of the network elements and the characteristics of those links.

For example, FIG. 6 is an exemplary traffic engineering data structure 116 representing the topology of the MPLS network 500 according to one embodiment of the invention. The exemplary traffic engineering data structure 116 illustrated in FIG. 6 includes a node level 620 and a link level 630. The information in the node level 620 and the link level 630 represent the MPLS network 500 as illustrated in FIG. 5C. The node level 620 includes the network element column 602, which identifies network elements in the network. The node level 620 also includes a link tree column 604, which identifies a link tree entry in the link level 630, and an exclude bit column 606 which identifies whether a particular network element should be excluded from consideration during CSPF processing (e.g., if the exclude bit is set to 1 for a particular network element, that network element will be excluded from consideration during CSPF processing). It should be understood that the information in the exclude bit column 606 is not advertised by the network elements in the MPLS network 500. The link level 630 includes the link tree column 604, the link column 608 (which identifies a link in the network 500), the cost column 610 (which identifies the cost of the link), the bandwidth column 612 (which identifies the available bandwidth of the link), the exclude bit 614 (which identifies whether the link should be excluded from consideration during CSPF processing), the re-optimization bit column 616 (which identifies whether the link needs to have re-optimization processing, which will be described in greater detail later herein), and the currently allocated bandwidth column 618 (which indicates a current allocation of bandwidth for a link, which will be described in greater detail later herein). It should be understood that the exemplary traffic engineering data structure illustrated in FIG. 6 is for illustrative purposes, and it does not include other information for each link (e.g., IP address, type, link color, etc.).

Sometime later, at operation 3, the network element 100 receives an LSP service request with one or more constraints including at least one exclusion constraint or a re-optimization request. Of course, it should be understood that a re-optimization request may include one or more exclusion constraints. According to one embodiment of the invention, the request is received at the signaling protocol module(s) 140 (e.g., RSVP, LDP) via the command line interface 130 (e.g., the service request is converted into a signaling request). For example, a network administrator may request an LSP with one or more constraints, and identify which nodes and/or links to exclude from path computation, via the command line interface 130. Similarly, a network administrator may request a re-optimization for an LSP that was previously computed.

At operation 4, the signaling protocol module(s) 140 requests path computation or path re-optimization, depending on the service request received, to be performed by the PCE 110. Sometime later, at operation 5, the pre-path computation module 114 marks one or more attribute bits in the traffic engineering data structure 116 based on the request. According to one embodiment of the invention, the attribute bits may include an exclusion bit and a re-optimization bit. For example, if the request includes one or more nodes and/or links to be excluded from CSPF processing, the exclusion bit for those nodes and/or links is marked by the pre-path computation module 114. As another example, if the request is a re-optimization request for an LSP, the re-optimization bit for the links of the LSP are marked by the pre-path computation module 114.

Figure 3:
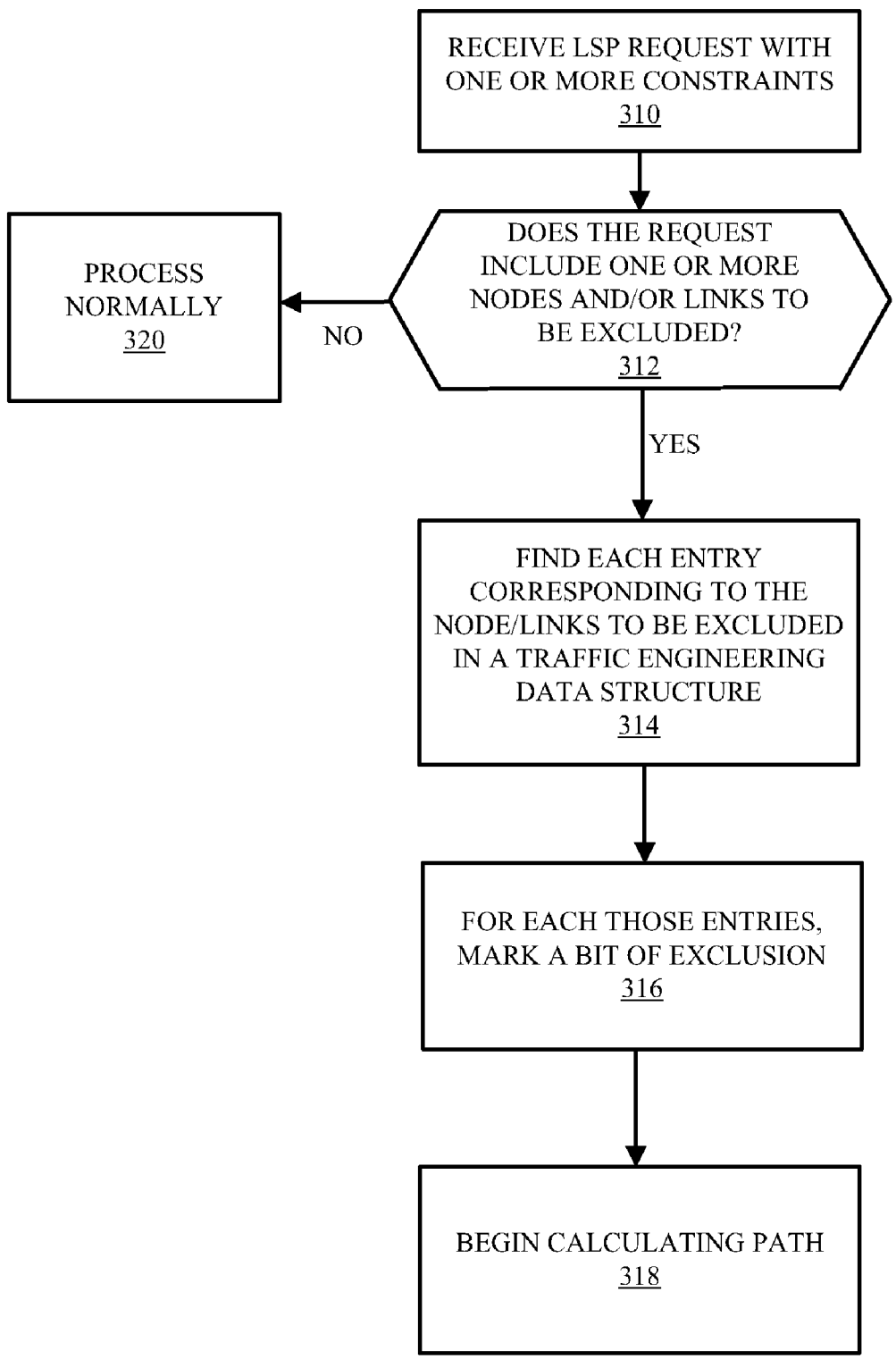
FIG. 3 is a flow diagram illustrating an exemplary pre-path computation for a request with one or more exclusion constraints according to one embodiment of the invention.

FIG. 3 is a flow diagram illustrating an exemplary pre-path computation for a request with one or more exclusion constraints according to one embodiment of the invention. At block 310, a LSP request is received which includes one or more constraints, and flow moves to block 312. With reference to FIG. 5A, as an example request, a network administrator may request a path to the network element 508 with the constraints that the path not go through the links 510 or 514, and have a minimum bandwidth of 50. Thus, for illustration purposes, in FIG. 5A, the links 510 and 514 in FIG. 5A include a large "X" denoting that these links are to be excluded from consideration when computing the path to the network element 508. Referring back to FIG. 3, at block 312, a determination is made whether the request includes one or more nodes and/or links to be excluded. If there are no nodes or links to be excluded (thus the request does not include an exclusion constraint), the request is processed in a typical CSPF fashion at block 320. However, if there is at least one node or link to be excluded then flow moves to block 314.

At block 314, each entry corresponding to the nodes and/or links to be excluded are identified in the traffic engineering data structure. Using the same example as above, the entries for the links 510 and 514 are identified in the traffic engineering data structure 116. Flow moves from block 314 to block 316, where each of those identified entries are marked with a bit of exclusion. Using the above example, the exclusion bit for the entries corresponding to the links 510 and 514 are marked. For example, referring to FIG. 6, the exclude bit 614 for the entries corresponding to the links 510 and 514 are marked with a bit of 1, which indicates that these links are to be excluded. It should be understood that if the request includes a network element to be excluded, the exclude bit 606 in the node level 620 would be marked in a similar fashion. In addition, according to one embodiment of the invention, if a network element is to be excluded, each exclude bit 614 associated with that network element is inherently marked. After each of the excluded bits is set based on the request, flow moves to block 318 where calculation of the path begins. Thus, referring back to FIG. 1, at operation 7, the CSPF computation module 118 computes the path based on the one or more constraints, and the data in the traffic engineering data structure 116.

Figure 2A:
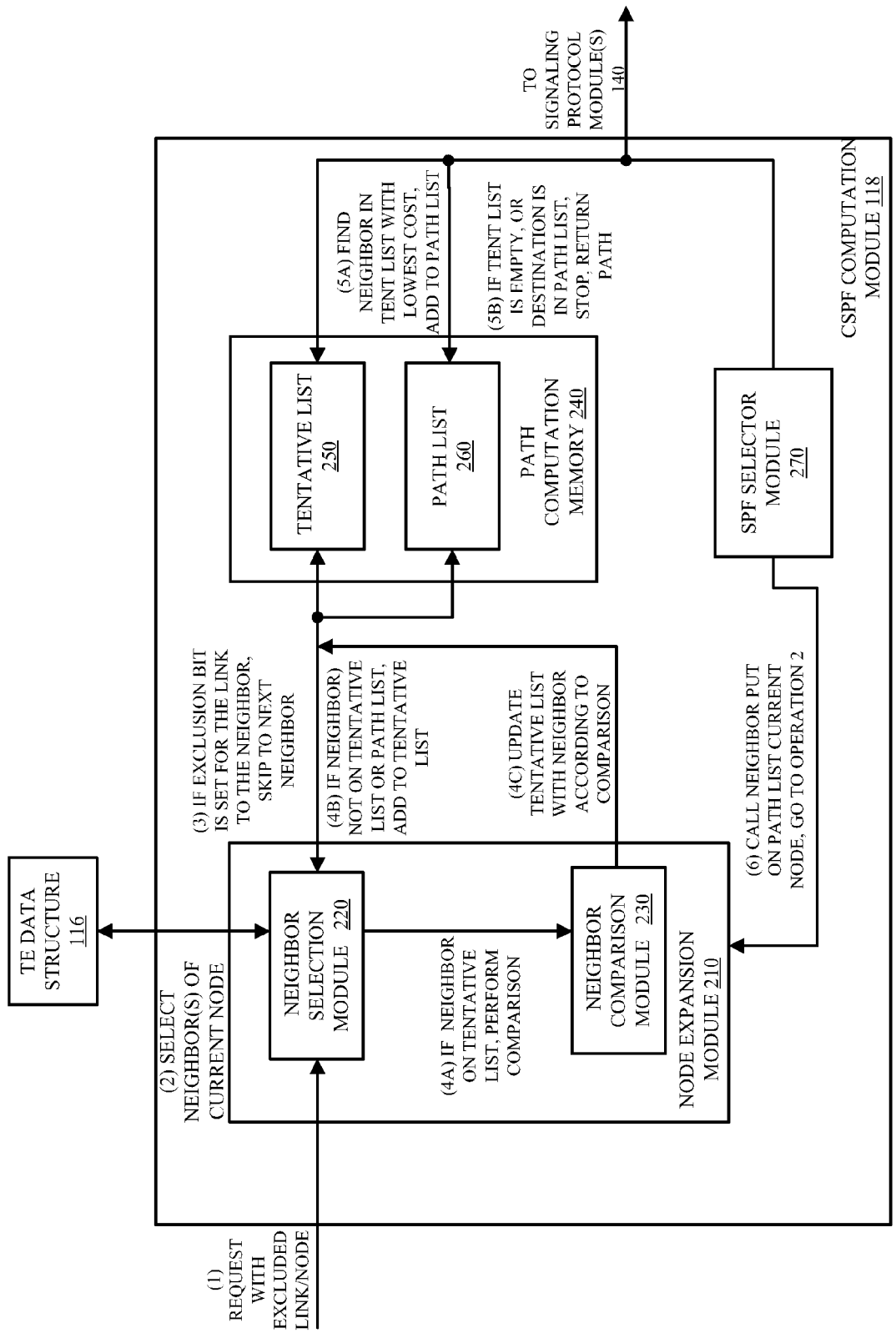
FIG. 2A is a data flow diagram illustrating an exploded view of a constrained shortest path first computation module illustrated in FIG. 1 computing a path based on one or more exclusion constraints according to one embodiment of the invention.

FIG. 2A is a data flow diagram illustrating an exploded view of the CSPF computation module 118 computing a path based on one or more exclusion constraints according to one embodiment of the invention. The CSPF computation module 118 includes the node expansion module 210 coupled with the path computation memory 240, and the SPF selector module 270 coupled with the path computation memory 240 and the node expansion module 210. The node expansion module 210 includes the neighbor selection module 220 and the neighbor comparison module 230. The path computation memory 240 includes the tentative list 250 and the path list 260. The path computation memory 240 may take on a variety of forms in different embodiments of the invention, including volatile memory (e.g., DRAM, SRAM, etc.) and non-volatile memory (e.g., hard disk, flash memory, phase change memory (PCM), etc.). In addition, the path computation memory 240 may be local memory to the CSPF computation module 118 or in shared memory of the network element 100. During CSPF computation, the tentative list 250 will include a list of next hops (neighbors) that may or may not be a part of the CSPF path towards the destination. Similarly, the path list 260 will include a list of next hops (neighbors) that are known to be part of the CSPF path towards the destination.

At operation 1, a request for a path with one or more excluded nodes or links, and zero or more other constraints (e.g., bandwidth, link color, number of hops, etc.) is received at the CSPF computation module 118. For illustration purposes, the same example request as previously described will be used throughout discussion of FIG. 2A (i.e., a path to the network element 508 with the constraints that the path not go through the links 510 or 514, and have a minimum bandwidth of 50).

At operation 2, the neighbor selection module 220 selects the neighbor(s) of the current node. At the beginning of the node expansion process, the current node is the source node (e.g., network element 100). Each selected neighbor of the current node is a round of node expansion. According to one embodiment of the invention, the neighbor selection module 220 uses the information in the traffic engineering data structure 116 to identify the neighbors of the current node. At operation 3, the neighbor selection module 220 determines if the exclusion bit is set for the link to the neighbor(s). According to one embodiment of the invention, the neighbor selection module 220 looks up the exclude bit 614 for the link to determine if that link is to be excluded. For example, for a first round of node expansion (e.g., from the network element 100 to the network element 502) the neighbor selection module 220 determines if the exclusion bit is set for the link 510 (as indicated in the link tree P1). Continuing with the example, for the second round of node expansion (e.g., from the network element 100 to the network element 504), the neighbor selection module 220 determines if the exclusion bit is set for the link 512 (the link 512 as indicated in the link tree P1). If the exclusion bit is set for a link to a neighbor, then that neighbor is skipped (e.g., the neighbor is not put into the tentative list 250). According to one embodiment of the invention, if a network element is not put in the tentative list 250, that link to the network element will be excluded from consideration for the path. According to one embodiment of the invention, all of the link(s) to the neighbor(s) that do not have a marked exclusion bit may be put in the tentative list 250, and may be considered during calculation of the path (more detail regarding when and why these links may not be put on the tentative list 250 will be described in greater detail later herein).

It should be understood that a typical network element performing typical CSPF computation with exclusion constraints, requires, for each level of node expansion, a lookup for each link to exclude based on request to determine whether to exclude that link from CSPF computation. For example, a CSPF computation may require M rounds of node expansion, where M may go up to the permutation of N (the number of network elements in the network). If there are K number of links to be excluded (e.g., based on the request), the number of comparisons performed to determine which links to exclude from CSPF processing may be as high as M(the number of rounds of node expansion)*K(the number of links to be excluded). In a typical deployment, where M is close to N, the number of comparisons performed in typical CSPF computation is close to N*K. In contrast, in some embodiments of the invention, only a single lookup is performed to determine whether a link to a neighbor should be excluded from path computation. Using the above example, in embodiments of the invention, the number of comparisons performed to determine which links to exclude from CSPF processing is M(the number of rounds of node expansion)*1 (the single lookup (e.g., single exclusion bit lookup)). In other words, instead of performing multiple comparisons during each round of node expansion, only a single comparison is performed during each round of node expansion. It will be understood that performing a single lookup to determine whether a link should be excluded increases the performance of CSPF processing (e.g., the computation is faster (there are less comparisons made), computing resources are saved (processing cycles, memory usage, etc.), etc. Furthermore, it will be understood that as the size of the network increases and the number of links to be excluded increases, the savings and performance advantages offered by embodiments of the invention also increases.

Referring back to FIG. 2A, after the neighbor selection module 220 determines that the link to a neighbor is not on the exclusion list, the neighbor selection module 220 determines if that link satisfies any other constraints that may be included in the request (e.g., bandwidth constraint, link color constraint, hop limit constraint, etc.). For example, when examining the link 518, the neighbor selection module 220 determines that the link 518 does not have enough available bandwidth according to the bandwidth constraint in the request (at least 50) (i.e., the link 518 has an available bandwidth of 40), and therefore does not add the network element 508 to the tentative list 250. If the link to the neighbor satisfies each constraint included in the request, the neighbor selection module 220 determines if the neighbor is already on the tentative list 250. It should be understood that during the first round of node expansion the tentative list 250 is empty. However, during subsequent rounds of node expansion, the tentative list 250 may include one or more network elements. If the neighbor is on the tentative list 250, then at operation 4A, the neighbor comparison module 230 performs a comparison to determine whether to replace the entry in the tentative list with the link currently under consideration. For example, according to one embodiment of the invention, the neighbor comparison module 230 compares the cost of the entry in the tentative list with the cost of the link currently under consideration. If the cost of the link currently under consideration is less than the cost of the entry in the tentative list, then at operation 4C the tentative list 250 is updated with the link to the neighbor currently under consideration. The neighbor comparison module 230 may also compare other attributes besides, or in addition to, cost, including bandwidth, number of hops, etc. If the neighbor is not on the tentative list 250, or the path list 260, then at operation 4B, the neighbor is added to the tentative list 250.

At operation 5A, the SPF selector module 270 finds the neighbor in the tentative list 250 with the lowest cost, and adds it to the path list 260. If the tentative list 250 is empty, or the destination is in the path list 260, then at operation 5B the SPF selector module 270 stops the computation and returns the computed path to the signaling protocol module(s) 140. However, if the tentative list 150 is not empty and the path list 260 does not include the destination, then at operation 6, the neighbor put on the path list 250 (e.g., in operation 5A) is the current node, and operations begin at operation 2 (e.g., for another round of node expansion).

Referring back to FIG. 1, at operation 7, the CSPF computation module 118 returns the computed path to the signaling protocol module(s) 140. The signaling protocol module(s) 140 perform a signaling request with the computed path. For example, the signaling protocol module(s) 140 attempt to reserve the bandwidth along the computed path. For example, if the constraint included a minimum bandwidth of 50, the signaling protocol module(s) 140 attempt to reserve at least a bandwidth of 50 along each link of the computed path. If the bandwidth is reserved, then at operation 9 the label manager 150 establishes the LSP. While not shown in FIG. 1, the label manager 150 may interrelate with one or more routing tables in the control plane and/or data plane of the network element 100 to establish the LSP. For example, the label manager 150 may cause the label to be selectively downloaded to one or more label forwarding information bases (LFIBs) on one or more line cards of the network element 100. Additionally, the label manager 150 may interact with a routing information base (RIB) to, for example, determine layer 2 next hop routes for that LSP.

Figure 5B:
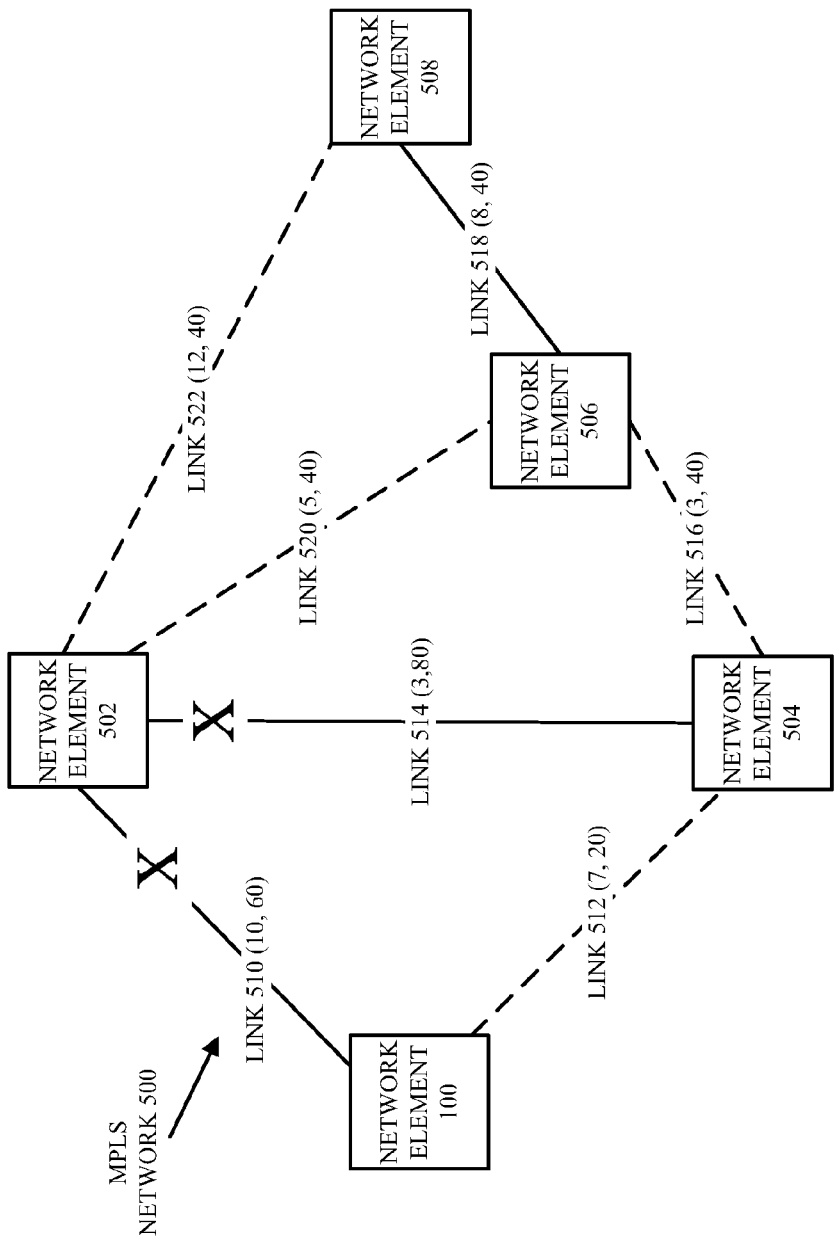
FIG. 5B is a block diagram illustrating the exemplary network of FIG. 5A after a path has been computed according to one embodiment of the invention.
Figure 5C:
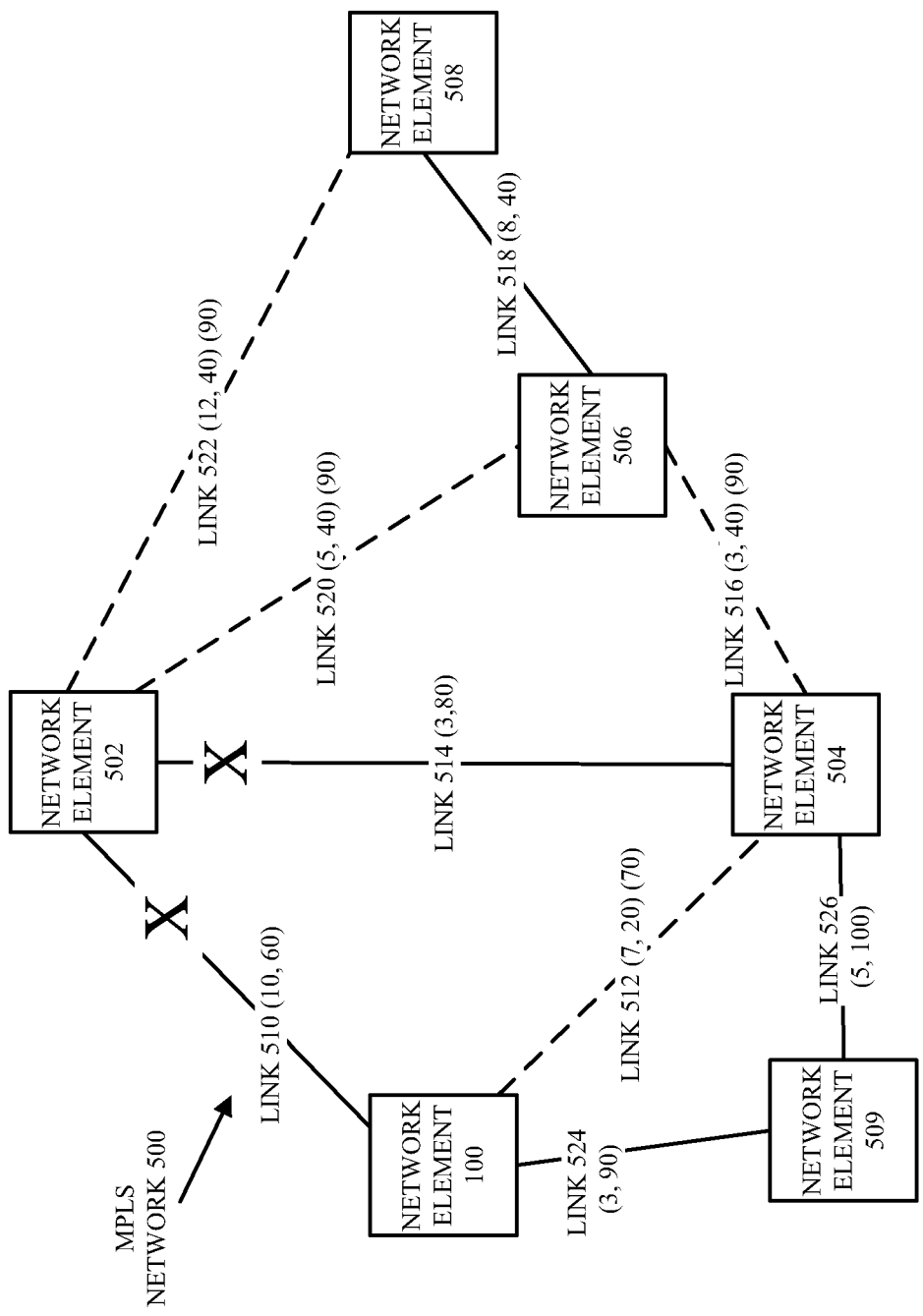
FIG. 5C is a block diagram illustrating the exemplary network of FIGS. 5A and 5B after a network element has joined the network according to one embodiment of the invention.

FIG. 5B is a block diagram illustrating the exemplary network of FIG. 5A after a path has been computed according to one embodiment of the invention. FIG. 5B represents the topology of the MPLS network 500 after the path has been computed for the example request (a path to the network element 508 with the constraints that the path not go through the links 510 or 514, and have a minimum bandwidth of 50). Thus, the links 510 and 514 include a large "X" denoting that these links were excluded from consideration when computing the path to the network element 508, and the links 512, 516, 520, and 522 are represented by dashed lines to indicate that the path travels on these links (thus, the path does not go through link 518 (link 518 did not have enough minimum bandwidth)). In addition, since the network element 100 reserved a bandwidth of 50 for each link of the path, the links 512, 516, 520, and 522 each advertise an available bandwidth of 50 less than what was advertised in FIG. 5A. Thus, the link 512 has an available bandwidth of 20, the link 516 has an available bandwidth of 40, the link 520 has an available bandwidth of 40, and the link 522 has an available bandwidth of 40.

After the path is computed, according to one embodiment of the invention, the set exclusion bit(s) in the traffic engineering data structure 116 are cleared. According to another embodiment of the invention, each incoming request is assigned a version identification number, and the version identification number is associated with the marked exclusion bit(s). For example, if the request version identification number does not match the version identification number associated with the exclusion bit(s), those exclusion bits (marked or unmarked) are not taken into account during path computation (thus, only those exclusion bits that are marked that are associated with the same identification number of the request are used during path computation).

Referring back to FIG. 1, if the request is to re-optimize the computed path (e.g., the computed path as illustrated in FIG. 5B), after the re-optimization bit(s) are marked based on the request (e.g., during operation 5), at operation 6 the allocated bandwidth storing module 160 returns the allocated link bandwidth to the traffic engineering data structure 116 for the links of the path. For example, in the exemplary traffic engineering data structure 116 illustrated in FIG. 6, the attribute bit marking module 162 marks the re-optimization bits 616 of the links of the path to be re-optimized, and the allocated bandwidth storing module 160 returns the currently allocated bandwidth to the currently allocated bandwidth 618 for those links. Using the example path computed for FIG. 5B, re-optimization bits are set for the links 512, 516, 520, and 522, and the currently allocated bandwidth for those links are each 50. It should be understood that in the time between the path that is to be re-optimized was originally computed or configured and the re-optimization request, the network topology may change. For example, FIG. 5C is a block diagram illustrating the exemplary MPLS network of FIGS. 5A and 5B after the network element 509 has joined the network according to one embodiment of the invention.

Figure 4:
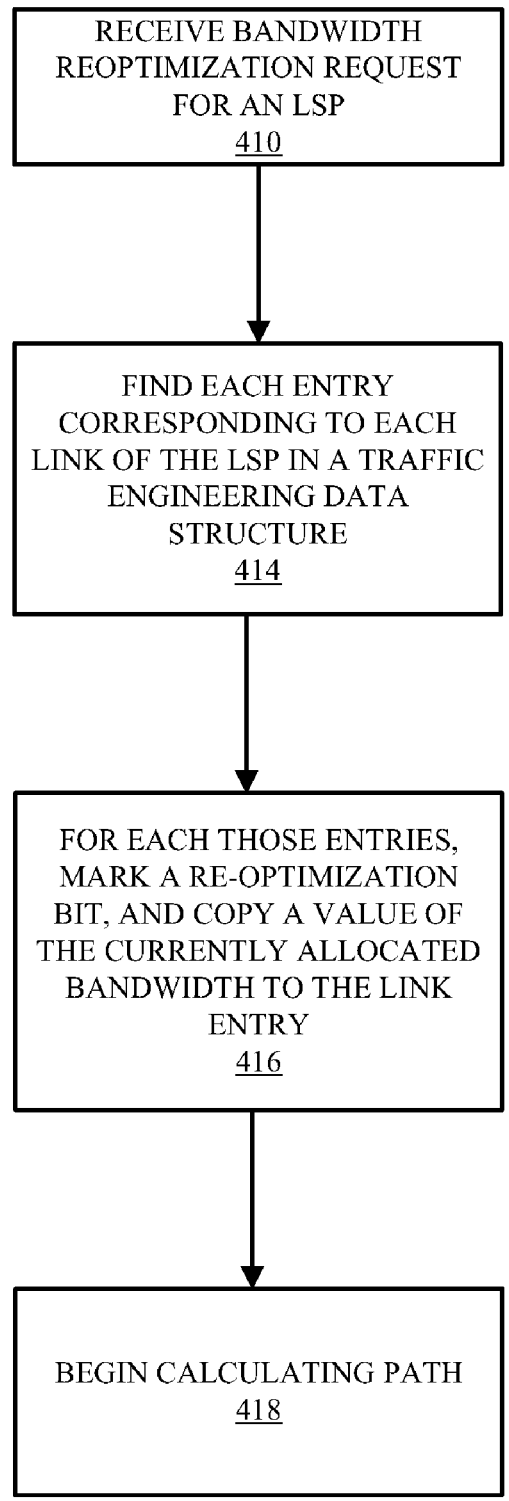
FIG. 4 is a flow diagram illustrating an exemplary pre-path computation for a re-optimization request according to one embodiment of the invention.

FIG. 4 is a flow diagram illustrating an exemplary pre-path computation for a re-optimization request according to one embodiment of the invention. At block 410, a bandwidth re-optimization request is received for a particular label switched path (LSP), and flow moves to block 414. According to one embodiment of the invention, the LSP may be computed by a PCE engine or manually configured by a network administrator. At block 414, each entry corresponding to each link of the LSP is identified in a traffic engineering data structure. Using the same example as above, the entries for the links 512, 516, 520, and 522 are identified in the traffic engineering data structure 116. Flow moves from block 414 to block 416, where each of those identified entries are marked with a re-optimization bit, and the value of the currently allocated bandwidth of that link is copied to the entry. After each of the re-optimization bits is set based to the request, and the currently allocated bandwidth is copied to each entry, flow moves to block 418 where calculation of the path begins. Thus, referring back to FIG. 1, at operation 7, the CSPF computation module 118 computes the path based on the one or more constraints, and the data in the traffic engineering data structure 116.

Figure 2B:
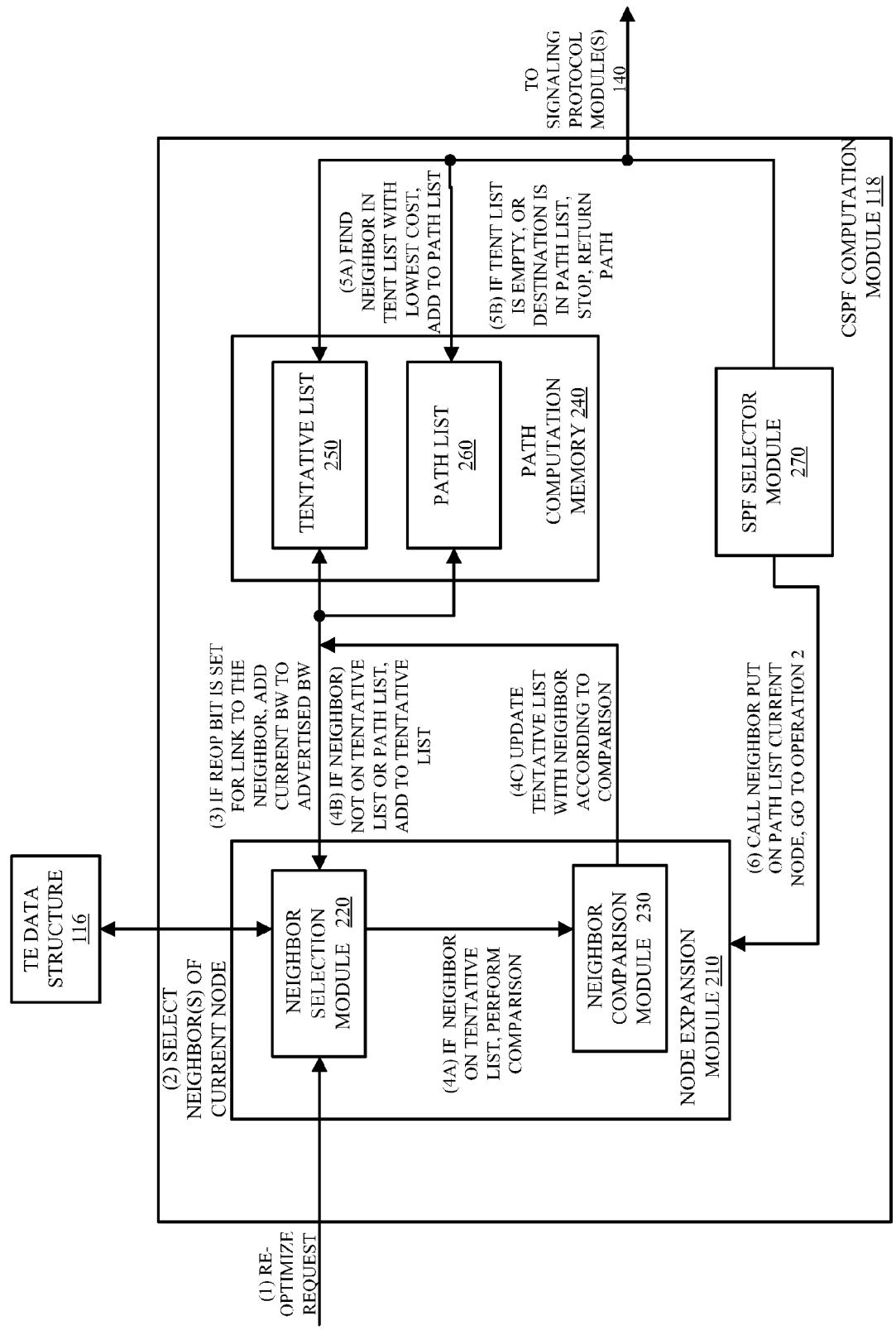
FIG. 2B is a data flow diagram illustrating an exploded view of the constrained shortest path first computation module illustrated in FIG. 1 computing a re-optimization request according to one embodiment of the invention.

FIG. 2B is a data flow diagram illustrating an exploded view of the constrained shortest path first computation module 118 illustrated in FIG. 1 computing a re-optimization request according to one embodiment of the invention. The CSPF computation module 118 includes the same architecture as that of the CSPF computation module 118 illustrated in FIG. 2A. At operation 1, a re-optimization bandwidth request for a particular path (LSP) is received at the CSPF computation module 118. For example, in a typical path re-optimization request, a network administer requests a certain (typically increased) amount of bandwidth. For illustration purposes, throughout discussion of FIG. 2B, the path described is the path illustrated in FIG. 5B (i.e., from the network element 100 to the destination network element 508 through the links 512, 516, 520 and 522), and the re-optimization request requests bandwidth of 80. It should be noted, that the path topology of the MPLS network 500 has changed since the path illustrated in FIG. 5B was computed. For purposes of illustration with reference to FIG. 2B, the topology as illustrated in FIG. 5C will be used. Thus, the network element 509, which is coupled with the network element 100 over the link 524 (cost of 3, available bandwidth of 90), and is coupled with the network element 504 over the link 526 (cost of 5, available bandwidth of 100) has joined the MPLS network 500 in Figure C.

With reference to FIG. 2B, at operation 2, the neighbor selection module 220 selects the neighbor(s) of the current node, in a similar fashion as described with reference to operation 2 of FIG. 2A. Thus, for example, when the network element 100 is the current node (e.g., at the beginning of the path re-optimization), the network elements 502, 504, and 509 are selected. At operation 3, the neighbor selection module 220 determines if the re-optimization bit is set for the link to the neighbor(s). According to one embodiment of the invention, the neighbor selection module 220 looks up the re-optimization bit 614 for the link to determine if the allocated bandwidth should be added with the advertised bandwidth. For example, for a first round of node expansion (e.g., from the network element 100 to the network element 512) the neighbor selection module 220 determines if the re-optimization bit is set for the link 512 (as indicated in the link tree P1 of FIG. 6). If the re-optimization bit is set, the currently allocated bandwidth is added to the advertised bandwidth to form a re-optimization comparison value. For example, in FIG. 5C, the links 512, 516, 520, and 522 are illustrated with their advertised bandwidth, and the re-optimization comparison value for the path. For example, the link 512 advertises a bandwidth of 20, but for purposes of re-optimizing the path, the link may be treated as having a possible bandwidth of 70 (i.e., bandwidth of 50 that is currently allocated for that path plus bandwidth of 20 that is advertised). Similarly, the links 516, 520, and 522 each advertise a bandwidth value of 40, but for purposes of re-optimizing the path, the links 516, 520, and 522 may each be treated as having a possible bandwidth of 90.

The re-optimization comparison value is used during bandwidth comparison. For example, the re-optimization comparison value is compared with the requested amount of bandwidth during the path re-optimization processing to determine if the links of the path meet the requested amount of bandwidth. According to one embodiment of the invention, the re-optimization comparison value is temporarily stored in the path computation memory 240.

It should be understood that a typical network element performing typical path re-optimization, requires, for each level of node expansion, a lookup to be performed for each link of the LSP to determine whether to account for the currently allocated bandwidth. For example, a path re-optimization may require M rounds of node expansion, where M may go up to the permutation of N (the number of network elements in the network). If there are K number of links in the path, the number of comparisons performed to determine which links to account for the currently allocated bandwidth may be as high as M(the number of rounds of node expansion)*K(the number of links in the path). In a typical deployment, where M is close to N, the number of comparisons performed in typical CSPF computation is close to N*K. In contrast, in some embodiments of the invention, only a single lookup is performed to determine whether to account for currently allocated bandwidth of a link. Using the above example, in embodiments of the invention, the number of comparisons performed to determine which links to account for the currently allocated bandwidth is M(the number of rounds of node expansion)*1(the single lookup (e.g., single re-optimization bit lookup)). In other words, instead of performing multiple comparisons during each round of node expansion, only a single comparison is performed during each round of node expansion. It will be understood that performing a single lookup to determine whether to account for currently allocated bandwidth of a link increases the performance of path re-optimization (e.g., the computation is faster (there are less comparisons made), computing resources are saved (processing cycles, memory usage, etc.), etc.). Furthermore, it will be understood that as the size of the network increases and the number of links of the path increases, the savings and performance advantages offered by embodiments of the invention also increases.

Referring back to FIG. 2B, after the neighbor selection module 220 determines whether to account for currently allocated bandwidth of a link, the neighbor selection module 220 determines if that link satisfies any other constraints that may be included in the request (e.g., bandwidth constraint, link color constraint, hop limit constraint, etc.). For example, using the example of a re-optimization request for the path with a minimum bandwidth of 90, when examining the link 512, the neighbor selection module 220 determines that the link 512, even with accounting for the currently allocated bandwidth, does not have enough available bandwidth according to the bandwidth constraint in the request (at least 80) (i.e., the re-optimization comparison value of the link 512 is equal to 70), and therefore does not add the network element 504 to the tentative list 250. If the link to the neighbor satisfies each constraint included in the request, the neighbor selection module 220 determines if the neighbor is already on the tentative list 250. It should be understood that during the first round of node expansion the tentative list 250 is empty. However, during subsequent rounds of node expansion, the tentative list 250 may include one or more network elements. If the neighbor is on the tentative list 250, then at operation 4A, the neighbor comparison module 230 performs a comparison to determine whether to replace the entry in the tentative list with the link currently under consideration. For example, according to one embodiment of the invention, the neighbor comparison module 230 compares the cost of the entry in the tentative list with the cost of the link currently under consideration. If the cost of the link currently under consideration is less than the cost of the entry in the tentative list, then at operation 4C the tentative list 250 is updated with the link to the neighbor currently under consideration. The neighbor comparison module 230 may also compare other attributes besides, or in addition to, cost, including bandwidth, number of hops, etc. If the neighbor is not on the tentative list 250, or the path list 260, then at operation 4B, the neighbor is added to the tentative list 250.

At operation 5A, the SPF selector module 270 finds the neighbor in the tentative list 250 with the lowest cost, and adds it to the path list 260. If the tentative list 250 is empty, or the destination is in the path list 260, then at operation 5B the SPF selector module 270 stops the computation and returns the computed path to the signaling protocol module(s) 140. However, if the tentative list 150 is not empty and the path list 260 does not include the destination, then at operation 6, the neighbor put on the path list 250 (e.g., in operation 5A) is the current node, and operations begin at operation 2 (e.g., for another round of node expansion).

Referring to FIG. 5C, it should be understood that the path computed as a result of the path re-optimization request with a minimum bandwidth of 80 includes different links than the original path. For example, the link 512 does not meet the minimum bandwidth of the request (e.g., 80). However, a path to the network element 508 exists which meets the re-optimized request. For example, the re-optimized path to the destination network element 508 takes the following path: 1) the network element 100 to the network element 509 via the link 524; 2) the network element 509 to the network element 504 via the link 526; 3) the network element 504 to the network element 506 via the link 516; 4) the network element 506 to the network element 502 via the link 520; and 5) the network element 502 to the destination network element 508 via the link 522.

After the re-optimization path is computed (regardless of whether a re-optimization path exists), according to one embodiment of the invention, the set re-optimization bit(s) and the currently allocated bandwidth entries are cleared in the traffic engineering data structure 116. According to another embodiment of the invention, each incoming re-optimization path request is assigned a version identification number, and the version identification number is associated with the marked re-optimization bit(s) and the currently allocated bandwidth entries. For example, if the request version identification number does not match the version identification number associated with the re-optimization bit(s) and currently allocated bandwidth entries, those re-optimization bits (marked or unmarked) and those currently allocated bandwidth entries are not taken into account during path computation (thus, only those re-optimization bits that are marked and those currently allocated bandwidth entries that are associated with the same identification number of the request are used during path re-optimization).

While the re-optimization request described was configured by a network administrator, in alternative embodiments of the invention the re-optimization request is automatically configured by the network element upon a network element joining the network.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.)

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A computer implemented method for performing a constrained shortest path first (CSPF) computation of a label switched path (LSP) from a first network element in a Multiprotocol Label Switching (MPLS) network acting as a source of the LSP to a second network element in the MPLS network acting as a destination of the LSP based on one or more traffic engineering constraints, wherein the MPLS network includes a plurality of other network elements acting as intermediaries between the source and the destination providing a plurality of paths between the source and destination, comprising:

storing a representation of the MPLS network's topology including a set of one or more link characteristics for each link in the MPLS network in a traffic engineering data structure, wherein each link connects two of the network elements;

receiving a first request to compute the LSP, the request including a set of one or more links to be excluded from the LSP;

setting an exclusion bit for each link that is to be excluded;

during calculation of the first request, for each network element that is not the destination, determining whether the exclusion bit is set for the link to each neighboring network element, and disregarding each link from the calculation whose corresponding exclusion bit is set;

receiving a second request to re-optimize bandwidth of the LSP, the second request including a minimum bandwidth constraint;

for each of the links of the LSP,
setting a re-optimization bit, and
storing a value of allocated bandwidth for the link; and during calculation of the second request, for each network element that is not the destination, determining whether the re-optimization bit is set for the link to each neighboring network element, and if the re-optimization bit is set, adding the value of allocated bandwidth of the link to the link's current available bandwidth to form a re-optimization comparison value, and comparing the re-optimization comparison value with the minimum bandwidth constraint.

2. The computer implemented method of claim 1, further comprising:

receiving a third request to compute the LSP, the request including a set of one or more network elements to be excluded form the LSP;

setting an exclusion bit for each network element that is to be excluded; and during calculation of the third request, for each network element that is not the destination, determining whether the exclusion bit is set for each neighboring network element, and disregarding each network element from the calculation whose corresponding exclusion bit is set.

3. The computer implemented method of claim 2, further comprising setting the exclusion bit and the re-optimization bit in the traffic engineering data structure.

4. The computer implemented method of claim 3, further comprising storing the value of allocated bandwidth of each link of the LSP in the traffic engineering data structure.

5. The computer implemented method of claim 1, wherein the link characteristics are advertised from the network elements in the MPLS network.

6. The computer implemented method of claim 1, further comprising reserving resources along the route of the LSP and updating the traffic engineering data structure based on the LSP.

7. The computer implemented method of claim 1, wherein the second request further includes one or more links or network elements to be excluded from the LSP.

8. The computer implemented method of claim 3, further comprising clearing each set exclusion bit or set re-optimization bit after each request has been calculated.

9. A network element to perform a constrained shortest path first (CSPF) computation based on one or more traffic engineering constraints, the network element comprising:

a routing protocol module to exchange traffic engineering information of a Multiprotocol Label Switching (MPLS) network;

a memory coupled with the routing protocol module, the memory to store a traffic engineering data structure to store traffic engineering information;

a signaling protocol module to receive a first request for a label switched path (LSP), the first request including one or more constraints, wherein at least one constraint includes a link to be excluded, and to receive a second request to re-optimize a LSP; and a path computation element (PCE) engine coupled with the signaling protocol module and the memory, the path computation engine including, a pre-path computation module to mark one or more attribute bits in the traffic engineering data structure based on the first and second requests, and a CSPF computation module to compute the LSP based on the first request and information in the traffic engineering data structure, and to re-optimize the LSP based on the second request and information in the traffic engineering data structure.

10. The network element of claim 9, wherein the pre-path computation module includes an attribute bit marking module to mark one or more exclusion bits in the traffic engineering data structure based on the first request and to mark one or more re-optimization bits in the traffic engineering data structure based on the second request.

11. The network element of claim 10, wherein the pre-path computation module further includes an allocated bandwidth storing module to copy allocated bandwidth of links of the LSP to the traffic engineering data structure based on the second request.

12. The network element of claim 11, wherein the CSPF computation module includes,
a node expansion module including,
a neighbor selection module to select a neighbor of a current node of a round of node expansion, and determine if an exclusion bit is set in the traffic engineering data structure for a link to that neighbor if a request includes a link to be excluded, and to determine if a re-optimization bit is set in the traffic engineering data structure for the link to that neighbor for a path re-optimization request.

13. The network element of claim 12, wherein if the exclusion bit is set, the neighbor selection module is further to skip that neighbor and perform a next round of node expansion.

14. The network element of claim 12, wherein if the re-optimization bit is set, the neighbor selection module is further to add advertised bandwidth of a link to the neighbor to the allocated bandwidth to form a re-optimization comparison value.

15. The network element of claim 14, wherein the second request further includes a requested amount of bandwidth, and wherein the re-optimization comparison value is compared against the requested amount of bandwidth to determine if the link to the neighbor meets the requested amount of bandwidth.

16. A machine-readable storage medium that provides instructions that, if executed by a processor, will cause said processor to perform operations for performing a constrained shortest path first (CSPF) computation of a label switched path (LSP) from a first network element in a Multiprotocol Label Switching (MPLS) network acting as a source of the LSP to a second network element in the MPLS network acting as a destination of the LSP based on one or more traffic engineering constraints, wherein the MPLS network includes a plurality of other network elements acting as intermediaries between the source and the destination providing a plurality of paths between the source and destination, comprising:
storing a representation of the MPLS network's topology including a set of one or more link characteristics for each link in the MPLS network in a traffic engineering data structure, wherein each link connects two of the network elements;
receiving a first request to compute the LSP, the request including a set of one or more links to be excluded from the LSP;
setting an exclusion bit for each link that is to be excluded;
during calculation of the first request, for each network element that is not the destination, determining whether the exclusion bit is set for the link to each neighboring network element, and disregarding each link from the calculation whose corresponding exclusion bit is set;
receiving a second request to re-optimize bandwidth of the LSP, the second request including a minimum bandwidth constraint;
for each of the links of the LSP,
setting a re-optimization bit, and
storing a value of allocated bandwidth for the link; and
during calculation of the second request, for each network element that is not the destination, determining whether the re-optimization bit is set for the link to each neighboring network element, and if the re-optimization bit is set, adding the value of allocated bandwidth of the link to the link's current available bandwidth to form a re-optimization comparison value, and comparing the re-optimization comparison value with the minimum bandwidth constraint.

17. The machine-readable storage medium of claim 16, further comprising:
receiving a third request to compute the LSP, the request including a set of one or more network elements to be excluded form the LSP;
setting an exclusion bit for each network element that is to be excluded; and
during calculation of the third request, for each network element that is not the destination, determining whether the exclusion bit is set for each neighboring network element, and disregarding each network element from the calculation whose corresponding exclusion bit is set.

18. The machine-readable storage medium of claim 17, further comprising setting the exclusion bit and the re-optimization bit in the traffic engineering data structure.

19. The machine-readable storage medium of claim 18, further comprising storing the value of allocated bandwidth of each link of the LSP in the traffic engineering data structure.

20. The machine-readable storage medium of claim 16, wherein the link characteristics are advertised from the network elements in the MPLS network.

21. The machine-readable storage medium of claim 16, further comprising reserving resources along the route of the LSP and updating the traffic engineering data structure based on the LSP.

22. The machine-readable storage medium of claim 16, wherein the second request further includes one or more links or network elements to be excluded from the LSP.

23. The machine-readable storage medium of claim 18, further comprising clearing each set exclusion bit or set re-optimization bit after each request has been calculated.

* * * * *